United States Patent
Colton et al.

(10) Patent No.: US 11,187,270 B2
(45) Date of Patent: Nov. 30, 2021

(54) LINER WITH IMPROVED RESISTANCE TO WEAR AND A PLAIN BEARING INCLUDING SUCH A LINER

(71) Applicant: AKTIEBOLAGET SKF, Gothenburg (SE)

(72) Inventors: Michael Brett Colton, Bristol (GB); Grant Dennis, Pontypridd (GB); Johnpaul Woodhead, Bristol (GB)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 15/931,251

(22) Filed: May 13, 2020

(65) Prior Publication Data
US 2020/0370598 A1 Nov. 26, 2020

(30) Foreign Application Priority Data
May 24, 2019 (EP) .................................... 19176393

(51) Int. Cl.
*F16C 11/06* (2006.01)
*F16C 33/12* (2006.01)
(Continued)

(52) U.S. Cl.
CPC ........ *F16C 33/125* (2013.01); *F16C 11/0614* (2013.01); *F16C 17/02* (2013.01);
(Continued)

(58) Field of Classification Search
CPC .... F16C 11/0614; F16C 17/02; F16C 23/043; F16C 25/02; F16C 33/043; F16C 33/125; F16C 33/201; F16C 33/203; F16C 33/208; F16C 33/16; F16C 2202/52; F16C 2206/06; F16C 2206/40; F16C 2206/44;
(Continued)

(56) References Cited

U.S. PATENT DOCUMENTS 3,428,374 A * 2/1969 Orkin .................. F16C 11/0614
384/213
9,045,376 B2 * 6/2015 Beard ..................... C04B 35/83
(Continued)

FOREIGN PATENT DOCUMENTS

CA 2918322 C 10/2017
CN 104379951 A * 2/2015 ............ F16C 33/046
(Continued)

OTHER PUBLICATIONS

European Search Report from the European Patent Office dated Nov. 18, 2019 in related EP application No. EP 19 17 6393, including European Search Opinion.

*Primary Examiner* — Marcus Charles
(74) *Attorney, Agent, or Firm* — J-Tek Law PLLC; Scott T. Wakeman; Mark A. Ussai

(57) ABSTRACT

A bearing liner includes a binder with a resin material, a pre-preg, a structural yarn and a lubricating yarn, and particles of aluminum oxide ($Al_2O_3$). The particles of aluminum oxide may be embedded within the binder or within the lubricating yarn, or may be embedded within both the binder and the lubricating yarn. A plain bearing includes an inner ring, an outer ring and such a liner interposed or disposed between the rings.

16 Claims, 2 Drawing Sheets

(51) Int. Cl.
*F16C 17/02* (2006.01)
*F16C 33/04* (2006.01)

(52) U.S. Cl.
CPC ........ *F16C 33/043* (2013.01); *F16C 2206/06* (2013.01); *F16C 2206/40* (2013.01); *F16C 2206/44* (2013.01); *F16C 2208/02* (2013.01); *F16C 2208/32* (2013.01); *F16C 2208/36* (2013.01); *F16C 2212/08* (2013.01)

(58) Field of Classification Search
CPC .............. F16C 2208/02; F16C 2208/04; F16C 2202/32; F16C 2208/36; F16C 2208/90; F16C 2212/08; F16C 2326/47; F16C 2208/32; F16N 1/00
USPC ....... 384/206, 276, 282, 289, 300, 907, 908, 384/907.1, 911
See application file for complete search history.

(56) References Cited

U.S. PATENT DOCUMENTS

| | | | |
|---|---|---|---|
| 9,400,013 B2 * | 7/2016 | Bell | F16C 33/20 |
| 9,422,642 B2 | 8/2016 | Moon et al. | |
| 9,702,406 B2 * | 7/2017 | Bell | F16C 33/208 |
| 10,307,991 B2 * | 6/2019 | Speicher | F16C 33/201 |
| 2004/0008914 A1 * | 1/2004 | Hiramatsu | F16C 33/201 384/276 |
| 2008/0104845 A1 * | 5/2008 | Lee | B29C 33/62 29/898.043 |
| 2012/0034428 A1 * | 2/2012 | Clarke | C04B 35/806 428/193 |
| 2015/0093066 A1 | 4/2015 | Speicher et al. | |
| 2016/0319055 A1 * | 11/2016 | Huh | C08F 114/26 |
| 2016/0326336 A1 | 11/2016 | Moon et al. | |

FOREIGN PATENT DOCUMENTS

| | | | | |
|---|---|---|---|---|
| EP | 2905487 A1 | 8/2015 | | |
| EP | 2955399 A1 | 12/2015 | | |
| EP | 2955400 A1 | 12/2015 | | |
| JP | S5774153 A | 5/1982 | | |
| KR | 20090027766 A * | 3/2009 | | D03D 15/49 |
| WO | WO-2009097366 A1 * | 8/2009 | | C04B 35/6269 |
| WO | WO-2013083985 A1 * | 6/2013 | | C25D 3/30 |

* cited by examiner

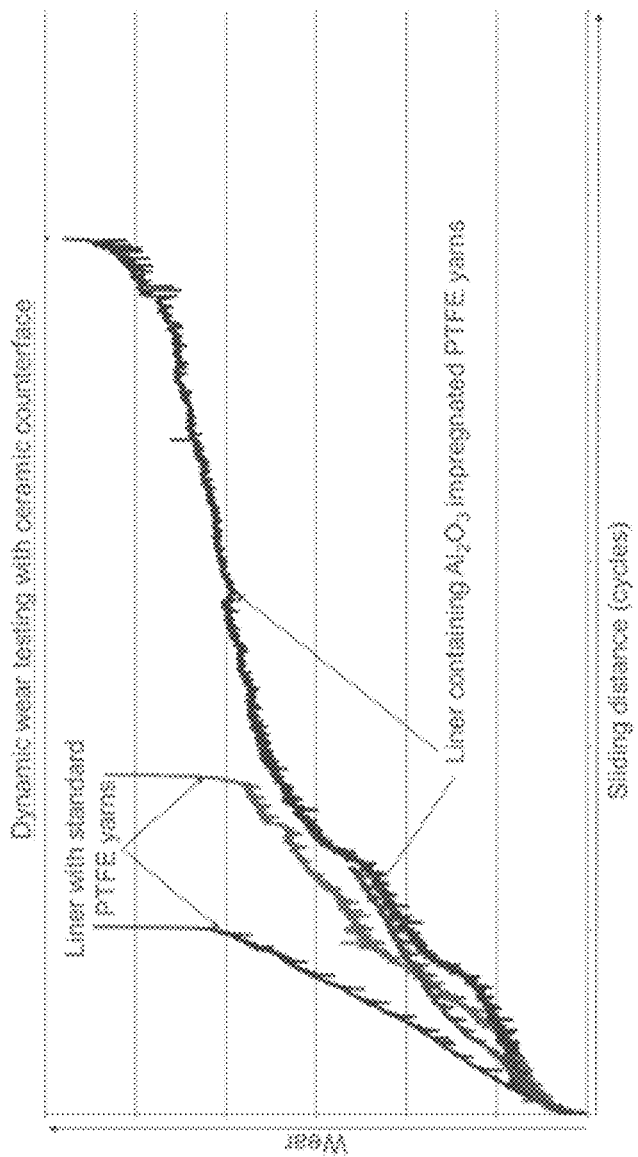

LINER WITH IMPROVED RESISTANCE TO WEAR AND A PLAIN BEARING INCLUDING SUCH A LINER

CROSS-REFERENCE

This application claims priority to European Patent Application No. 19176393.7, filed May 24, 2019, the entire contents of which are fully incorporated herein by reference.

BACKGROUND OF THE INVENTION

The present invention relates to bearings, and more particularly to plain bearings and liners for such bearings.

Plain bearings are known and often incorporate liners to lubricate contact between two parts in relative sliding motion and to reduce the wear of the parts. For example, EP2955400A1 teaches the use of a bearing liner with lubricating fibers and structural fibers to improve lubrication at the contact interface. However, the product life of such bearings is often limited by the life of the liner.

SUMMARY OF THE INVENTION

It is an object of the present invention to provide a liner which comprises a binder comprising a resin material, a pre-preg, a structural yarn, and at least a first lubricating yarn.

According to the invention, the liner further comprises particles of aluminum oxide ("Al$_2$O$_3$").

Due to the use of the liner of the present invention, wear of the liner is reduced with a corresponding increase in product life.

According to other aspects of the invention which are advantageous but not compulsory, such a liner may incorporate one or more of the following features:
  the matrix or binder comprises particles of Al$_2$O$_3$,
  the liner comprises a second lubricating yarn containing particles of Al$_2$O$_3$,
  the first and the second lubricating yarns comprise particles of PTFE and/or graphite and/or graphene.

It is another object of the invention to provide a plain bearing with an outer ring, an inner ring and a liner according to the present invention. The inner ring has an outer surface and the outer ring has an inner surface such that the liner is interposed or disposed between the outer surface and the inner surface.

According to other aspects of the invention which are advantageous but not compulsory, such a plain bearing may incorporate one or several of the following features:
  the plain bearing is a spherical plain bearing,
  the plain bearing is an aerospace plain bearing,
  the liner is fixed on the inner surface of the outer ring,
  the outer surface of the inner ring is made from ceramic material,
  the entire inner ring is made from ceramic material.

BRIEF DESCRIPTION OF THE SEVERAL VIEWS OF THE DRAWINGS

The present invention and its advantages will be better understood by studying the detailed description of specific embodiments given by way of non-limiting examples and illustrated by the appended drawings on which:

FIG. 3 shows the result of a wear test performed on a prior art liner and a liner according to the present invention.

DETAILED DESCRIPTION OF THE INVENTION

Figure 1:
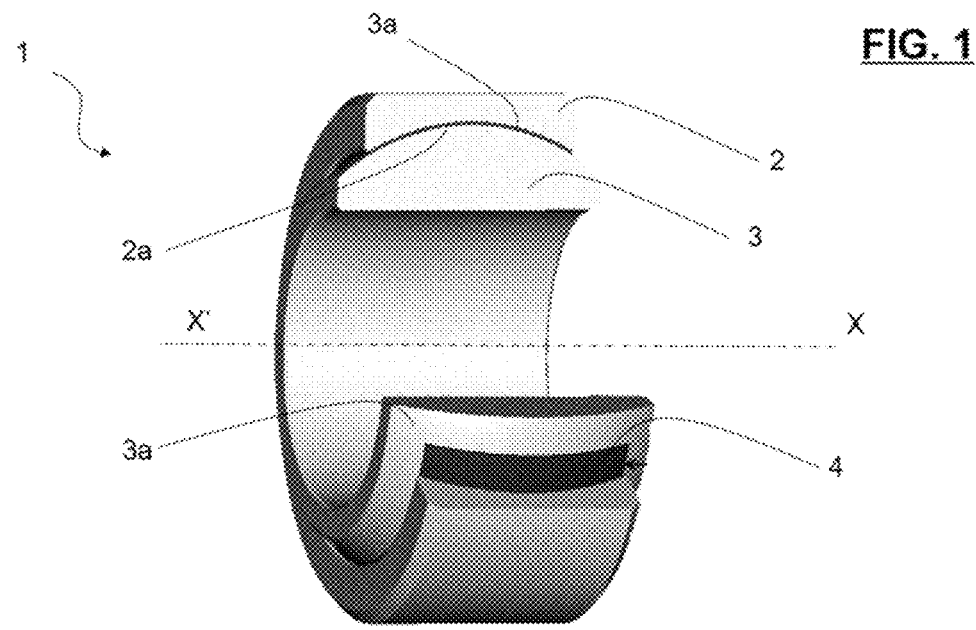
FIG. 1 shows a preferred embodiment of a plain bearing according to the invention and incorporating a liner according to the invention.

FIG. 1 illustrates a plain bearing 1 comprising an outer ring 2 and an inner ring 3. Both rings 2, 3 are symmetrical around or about an axis XX'. The outer ring 2 has an inner surface 2a on the outer ring inner periphery and the inner ring 3 has an outer surface 3a on the inner ring outer periphery. The inner and outer surfaces 2a, 3a, respectively, face each other and a liner 4 is interposed or disposed between the facing surfaces 2a, 3a.

Figure 2:
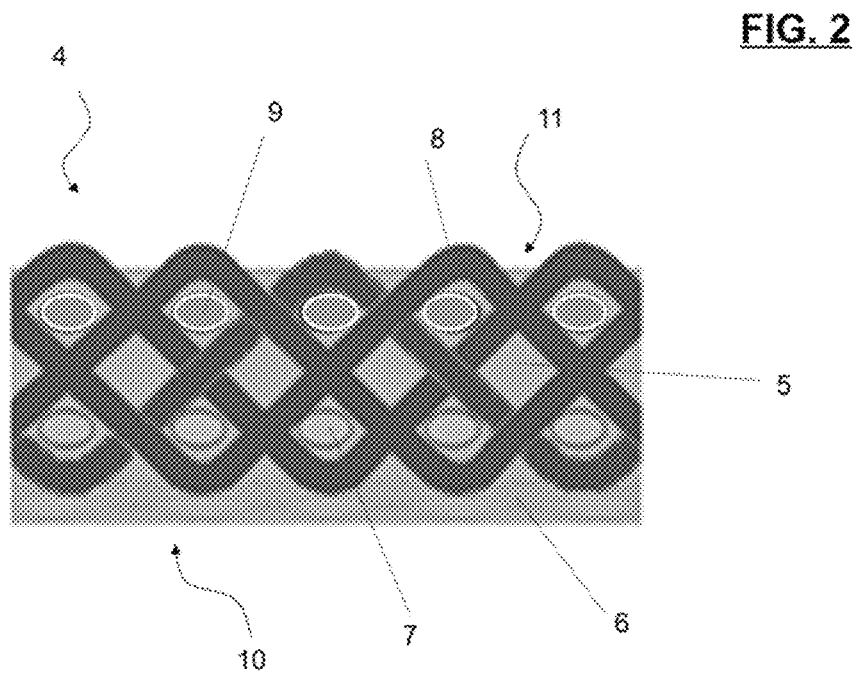
FIG. 2 shows in detail the structure of a liner according to the invention.

Referring to FIG. 2, the liner 4 is a composite self-lubricating liner and is in the form of a sheet with a first side 10 and an opposing second side 11. The liner 4 further comprises a binder or matrix 5 which preferably includes a resin. In a preferred embodiment of the invention, the resin is of the epoxy or phenolic type.

The liner 4 also comprises a woven fabric which is embedded partly or totally inside or within the binder 5. The woven fabric comprises a structural warp yarn 7 and a first lubricating warp yarn 8. In the present disclosure, the term "yarn" it is intended to include not only a single strand of yarn or fiber, but also a plurality of individual yarns, strands or fibers.

Preferably, the structural yarn 7 and the first lubricating yarn 8 are wrapped around or woven about each other. In a presently preferred embodiment of the invention, the structural yarn 7 is made of at least one of glass, carbon, aramid, polyether ether ketone ("PEEK"), polyester, polyamide, polyphenylene sulfide ("PPS") or/and aramid. Further, the first lubricating yarn 8 is preferably made of polytetrafluoroethylene ("PTFE"), graphite, or graphene. However, the first lubricating yarn 8 may alternatively be formed of any other appropriate solid lubricant.

The liner 4 further comprises a pre-impregnated or "pre-preg" 6 embedded in the binder 5. As is known, a pre-preg is a yarn or fiber that has been pre-impregnated with a resin, typically but not necessarily an epoxy resin. The pre-preg 6 is disposed on the first side 10 of the liner 4, and may be provided as individual fibers or as a preformed sheet of fibers. Preferably, the pre-preg 6 is either partly or entirely embedded within the binder 5 or impregnated with the binder 5.

The liner 4 is attached either to the outer surface 3a of the inner ring 3 or to the inner surface 2a of the outer ring 2 by any appropriate attachment means, such as for example, overmolding of the binder resin and/or by gluing.

In a preferred embodiment of the invention, the liner 4 is attached to the inner surface 2a of the outer ring 2 of the plain bearing 1, and most preferably the liner first side 10 is attached to the surface 2a. The second side or surface 11 of the liner 4 is intended to slide against the other one of the two rings 2, 3 to which the liner 4 is not attached, i.e., the liner second surface 11 slides against the inner ring 3 when the liner 4 is attached to the outer ring 2, and vice-versa.

Preferably, the first lubricating yarn 8 is partly embedded within the binder 5 so that the yarn 8 partially protrudes from the binder 5, preferably from the liner second side 11, and may directly contact one of the rings 2, 3.

Furthermore, the liner 4 also comprises particles of aluminum oxide ("$Al_2O_3$"). In a preferred embodiment of the invention, the particles of $Al_2O_3$ are embedded inside the binder 5.

In another preferred embodiment of the invention, the woven fabric of the liner 4 comprises a second lubricating yarn 9 including particles of $Al_2O_3$. Preferably, the second lubricating yarn 9 comprises yarn or fibers formed of PTFE, graphite, or graphene that have been impregnated with particles of $Al_2O_3$.

In yet another alternative embodiment of the invention, the particles of $Al_2O_3$ may be embedded both within the binder 5 and within the second lubricating yarn 9. Preferably, in any embodiment of the liner 4 which includes the second lubricating yarn 9, all of the structural yarn 7, the first lubricating yarn 8, and the second lubricating yarn 9 are wrapped around or woven about each other.

In use, when the rings 2, 3 of the plain bearing 1 slide with respect to each other, the liner 4 will eventually wear out after a certain period of use (i.e., the product life). However, due to the particles of $Al_2O_3$ in the present liner 4, the speed or rate of wear of the liner 4 is substantially reduced, with a corresponding increase in the product life of the liner 4.

In certain preferred embodiments of the invention, both the outer ring 2 and the inner ring 3 of the plain bearing 1 are each formed of a metallic material.

In other preferred embodiments of the invention, at least one of the rings 2, 3 is at least partially formed of a ceramic material. Preferably, the surface of the ring 2 or 3 which slides against the liner 4 is made or formed of a ceramic material. For example, a coating of ceramic material may be applied onto a metallic body of the ring 2 or 3. Alternatively, the entire ring 2 or 3 of the plain bearing 1 against which the liner 4 slides is made of ceramic material, i.e., the outer ring 2 is formed of ceramic material when the liner 4 is attached to the inner ring 3, and vice-versa.

In the depicted embodiments of the present invention, the plain bearing 1 is a spherical plain bearing in which the inner, concave surface 2a of the outer ring 2 and the outer, convex surface 3a of the inner ring 3 are each spherical. Further, the plain bearing 1 is preferably an aerospace plain bearing, i.e., used in an aerospace application.

FIG. 3 depicts the results of a dynamic wear test performed on a liner of the prior art and on a liner 4 formed in accordance with the present invention. The liner 4 of the present invention has PTFE yarn impregnated with $Al_2O_3$. The prior art liner differs from the liner 4 according to the present invention in that the prior art liner does not include particles of $Al_2O_3$.

The wear test was conducted by sliding each of the two liners against a counterface or countersurface made of different materials, including metals and ceramics.

From an examination of the results of the test as shown in FIG. 3, it is clear that the liner 4 according to the present invention performs outstandingly in comparison with the performance of the prior art liner, particularly when the counterface or countersurface is made of a ceramic material. As a result of the present invention, the life of the present liner 4 is increased in comparison with previously known bearing liners, which results in a corresponding increase in product life of any bearing 1 incorporating the liner 4.

Representative, non-limiting examples of the present invention were described above in detail with reference to the attached drawings. This detailed description is merely intended to teach a person of skill in the art further details for practicing preferred aspects of the present teachings and is not intended to limit the scope of the invention.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter. The invention is not restricted to the above-described embodiments, and may be varied within the scope of the following claims.

We claim:

1. A liner for a plain bearing, the liner comprising:
    a binder including a resin material;
    a pre-preg;
    a structural yarn; and
    a lubricating yarn including particles of aluminum oxide ($Al_2O_3$).

2. The liner according to claim 1, wherein the binder includes particles of aluminum oxide ($Al_2O_3$).

3. The liner according to claim 1, wherein the lubricating yarn is a first lubricating yarn and the liner further comprises a second lubricating yarn.

4. The liner according to claim 3, wherein each of the first lubricating yarn and the second lubricating yarn include particles of at least one of polytetrafluoroethylene (PTFE), graphite, and graphene.

5. A plain bearing comprising:
    an outer ring with an inner surface;
    an inner ring with an outer surface, each one of the outer ring and the inner ring being symmetrical about an axis, one of the inner ring outer surface and the outer ring inner surface being made of a ceramic material; and
    a liner disposed between the inner surface of the outer ring and the outer surface of the inner ring and including a binder having a resin material, a pre-preg, a structural yarn, and a lubricating yarn including particles of aluminum oxide ($Al_2O_3$), the liner being slidable against the ceramic surface of the inner ring or the outer ring.

6. The plain bearing according to claim 5, wherein the bearing is a spherical plain bearing.

7. The plain bearing according to claim 6, wherein the bearing is an aerospace plain bearing.

8. The plain bearing according to claim 5, wherein the liner is fixed on the inner surface of the outer ring and the outer surface of the inner ring is made from a ceramic material.

9. The plain bearing according to claim 8, wherein the entire inner ring is made from a ceramic material and the outer ring is made from a metallic material.

10. A liner for a plain bearing, the bearing including an inner ring and an outer ring, the liner comprising:
- a binder including a resin material;
- a woven fabric of structural yarn and lubricating yarn at least partially embedded within the binder, the lubricating yarn including particles of aluminum oxide ($Al_2O_3$); and
- a pre-preg disposed within or attached to the woven fabric.

11. The liner according to claim 10, wherein the lubricating yarn is a first lubricating yarn and the liner further comprises a second lubricating yarn.

12. The liner according to claim 11, wherein particles of aluminum oxide ($Al_2O_3$) are embedded within the binder.

13. The liner according to claim 12, wherein the pre-preg is disposed at or adjacent to the first side of the liner.

14. The liner according to claim 10, wherein the liner has a first side attachable to one of the inner and outer rings and a second side slidable against the other one of the inner and outer rings, the lubricating yarn partially protruding from the binder at the second side.

15. The liner according to claim 10, wherein the structural yarn and the lubricating yarn are wrapped about each other to form the woven fabric.

16. The liner according to claim 10, wherein:
- the structural yarn is formed of at least one of glass, carbon, aramid, polyether ether ketone ("PEEK"), polyester, polyamide, polyphenylene sulfide ("PPS") and aramid; and
- the lubricating yarn is formed of at least one polytetrafluoroethylene ("PTFE"), graphite and graphene.

* * * * *